(12) United States Patent
Dow et al.

(10) Patent No.: US 7,544,127 B2
(45) Date of Patent: Jun. 9, 2009

(54) STRAW CHOPPER FOR COMBINE WITH ADJUSTABLE STATIONARY KNIFE BANK

(75) Inventors: Chad Allen Dow, East Moline, IL (US); Merle Ray Gerber, Moline, IL (US)

(73) Assignee: Deere & Company, Moline, IL (US)

( * ) Notice: Subject to any disclaimer, the term of this patent is extended or adjusted under 35 U.S.C. 154(b) by 355 days.

(21) Appl. No.: 11/395,567

(22) Filed: Mar. 31, 2006

(65) Prior Publication Data

US 2007/0004479 A1 Jan. 4, 2007

Related U.S. Application Data

(60) Provisional application No. 60/695,653, filed on Jun. 30, 2005.

(51) Int. Cl.
*A01F 12/40* (2006.01)

(52) U.S. Cl. ...................................................... 460/112

(58) Field of Classification Search ................. 460/112, 460/111, 901; 241/243, 224, 195, 191, 332, 241/101.76; 239/650, 681, 666, 682; 56/504, 56/294, 341

See application file for complete search history.

(56) References Cited

U.S. PATENT DOCUMENTS

| 2,842,175 | A | * | 7/1958 | Thompson | 241/243 |
| 3,380,502 | A | * | 4/1968 | Gronberg | 241/224 |
| 3,874,604 | A | * | 4/1975 | Gronberg et al. | 241/243 |
| 4,077,573 | A | * | 3/1978 | Kersey et al. | 241/32 |
| 4,612,941 | A | * | 9/1986 | Kunde | 460/112 |
| 4,892,504 | A | * | 1/1990 | Scott et al. | 460/112 |
| 5,503,339 | A | * | 4/1996 | Doppstadt | 241/166 |
| 5,542,883 | A | * | 8/1996 | Cruson | 460/112 |
| 5,556,042 | A | * | 9/1996 | Roberg | 241/101.76 |
| 5,974,776 | A | * | 11/1999 | Prellwitz | 56/504 |
| 6,120,373 | A | * | 9/2000 | Schrattenecker | 460/112 |
| 6,616,528 | B2 | * | 9/2003 | Wolters et al. | 460/111 |

* cited by examiner

Primary Examiner—Árpád Fábián-Kovács
(74) Attorney, Agent, or Firm—Taylor & Aust, P.C.

(57) ABSTRACT

A straw chopper for an agricultural harvesting machine includes a housing, a rotor carried by the housing, and a stationary knife bank. The rotor includes a plurality of pendulously mounted knife blades. The stationary knife bank includes a plurality of stationary knife blades adjustably movable toward and away from the rotor. The stationary knife bank includes a tension rod extending longitudinally through the stationary knife bank and having a threaded end, and at least one wing nut threadingly engaged with the threaded end.

14 Claims, 5 Drawing Sheets

STRAW CHOPPER FOR COMBINE WITH ADJUSTABLE STATIONARY KNIFE BANK

CROSS REFERENCE TO RELATED APPLICATIONS

This is a non-provisional application based upon U.S. provisional patent application Ser. No. 60/695,653, entitled "STRAW CHOPPER FOR COMBINE WITH ADJUSTABLE STATIONARY KNIFE BANK", filed Jun. 30, 2005.

FIELD OF THE INVENTION

The present invention relates to agricultural harvesting machines, such as combines, and, more particularly, to straw choppers for such combines.

BACKGROUND OF THE INVENTION

An agricultural harvesting machine such as a combine includes a head and a feeder housing which remove the crop material from the field, gather the crop material and transport the crop material to a separator. In the case of thinner stemmed crops such as soybeans, wheat, etc. which may be cut with a sickle bar carrying a plurality of knives, the head may also be known as a cutting platform. The separator removes the grain crop material from the non-grain crop material. The grain is cleaned and deposited in a grain tank. When the grain tank becomes full, an unloading auger which is positioned alongside the combine during harvesting is moved to the unloading position in which the auger extends approximately perpendicular to the longitudinal axis of the combine. The combine drives alongside a vehicle into which the grain is to be unloaded, such as a semi-trailer, and the unloading auger is actuated to discharge the grain into the vehicle.

The non-grain crop material is transported from the separator to the rear of the combine, such as by using straw walkers, etc. If it is desired to maintain the non-grain crop material in windrows, such as when wheat straw is subsequently baled, then the non-grain crop material simply falls to the ground. On the other hand, if it is desired to distribute the non-grain crop material back to the field, then the non-grain crop material is typically transported to a straw chopper, and optionally a downstream blower.

Straw Choppers are used to reduce the size of crop material, other than grain, that is processed by the harvesting machine. Typically, the straw chopper includes a housing that encloses a rotor. The housing is provided with an inlet for receiving crop material other than grain that has been processed and an outlet for distributing the chopped crop material back to the field. The housing is also provided with a bank of stationary cutter knives. The rotor is provided with a plurality of pendulously mounted straw chopper blades that cooperate with the stationary knives to chop the crop material entering the straw chopper. The rotor typically includes a cylindrical tube having a plurality of mounting locations distributed around the periphery of the rotor. The straw chopper blades are pendulously mounted to the mounting locations.

It is known to provide a straw chopper with a stationary knife bank which may be adjusted such that the stationary knife blades extend through the housing a desired amount. Making adjustments with a conventional knife bank design requires that hardware be loosened and tightened on both the left and right hand side of the straw chopper. For an operator that changes crops daily, such as a corn and soybean farmer, it is recommended that the knife bank be engaged for beans and not engaged for corn. Adjusting the knife bank requires that two people make the adjustment by loosening the hardware, manually adjusting the knife bank into the desired position and then tightening the hardware to lock the knife bank in place. This conventional design also requires that tools be on hand and used to make the adjustments to the knife bank. The knife bank can bind during adjustment if one end is raised ahead of the other. The knife bank can be freed from binding by an operator laying on the ground on his back and kicking the knife bank. An alternative adjustment procedure, if only one person is available to make the adjustment, is to make several incremental adjustments from side to side. If a major adjustment is needed, such as moving from a fully engaged to a fully disengaged position, or vice versa, it cannot be done all at once or the above mentioned binding of the stationary knife bank can occur.

What is needed in the art is a straw chopper with a stationary knife bank that can be adjusted quickly, easily and accurately by one person without the use of tools.

SUMMARY OF THE INVENTION

The present invention provides a straw chopper on an agricultural combine with a stationary knife bank which can be easily adjusted relative to the rotor blades, without the use of tools.

The invention comprises, in one form thereof, a straw chopper for an agricultural harvesting machine, including a housing, a rotor carried by the housing, and a stationary knife bank. The rotor includes a plurality of pendulously mounted knife blades. The stationary knife bank includes a plurality of stationary knife blades adjustably movable toward and away from the rotor. The stationary knife bank includes a tension rod extending longitudinally through the stationary knife bank and having a threaded end, and at least one wing nut threadingly engaged with the threaded end.

The invention comprises, in another form thereof, a method of adjusting a stationary knife bank in a straw chopper of an agricultural harvesting machine, including the steps of: loosening a wing nut coupled with a tension rod extending through the stationary knife bank; moving a positioning handle attached to the stationary knife bank, thereby moving the stationary knife bank; and tightening the wing nut to lock the stationary knife bank in place.

DETAILED DESCRIPTION OF THE INVENTION

Figure 1:
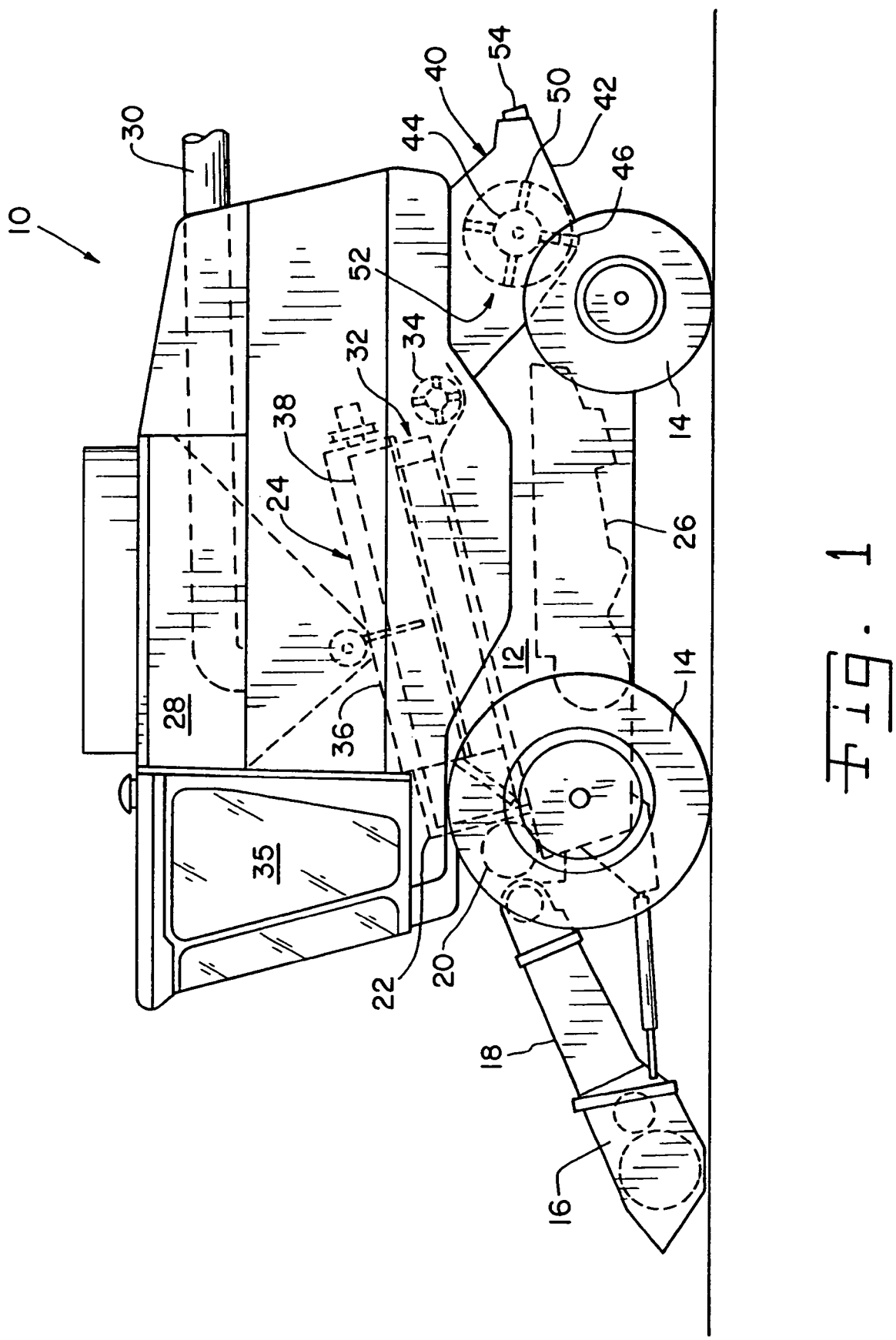
FIG. 1 is a side, schematic view of an agricultural harvesting machine including an embodiment of a straw chopper of the present invention.

Referring now to the drawings, and more particularly to FIG. 1, there is shown an agricultural harvesting machine in the form of a combine 10 including a supporting structure 12 having ground engaging wheels 14 extending from supporting structure 12. Although combine 10 is illustrated as having wheels 14, it could also have ground engaging tracks, either full tracks or half tracks. A harvesting platform 16 is used for harvesting a crop and directing it to a feederhouse 18. The harvested crop is directed by feederhouse 18 to an infeed beater 20, which directs the crop upwardly through an inlet transition section 22 to an axial crop processing unit 24.

Crop processing unit 24 threshes and separates the harvested crop material. Grain and chaff fall through grates on the bottom of unit 24 to cleaning system 26 which removes the chaff and directs the clean grain to a clean grain elevator (not shown). The clean grain elevator deposits the clean grain in grain tank 28. The clean grain in tank 28 can be unloaded into a grain cart or truck by an unloading auger 30.

Threshed and separated straw is discharged from axial crop processing unit 24 through outlet 32 to discharge beater 34, which in turn propels the harvested crop material other than grain to a straw chopper 40. The operation of combine 10 is controlled from an operator's cab 35.

The axial crop processing unit comprises a cylindrical rotor housing 36 and a rotor 38 located inside housing 36. The front part of rotor 38 and rotor housing 36 define the infeed section of crop processing unit 24. Longitudinally downstream from the infeed section are a threshing section, separating section and discharge section (not separately numbered). Rotor 38 in the infeed section is provided with a conical rotor drum having helical infeed elements for engaging harvested crop material received from the infeed beater 20 and inlet transition section 22. Immediately downstream from the infeed section is the threshing section of the crop processing unit 24. In the threshing section, rotor 38 includes a cylindrical rotor drum having a number of threshing elements for threshing the harvested crop material received from the infeed section. Downstream from the threshing section is the separating section where the grain trapped in the threshed crop material is released and falls through a floor grate to cleaning system 26. The separating section merges into a discharge section where crop material other than grain is expelled from axial crop processing unit 24 to discharge beater 34. Although the invention is illustrated as being used on a rotary combine, the present invention can be used on other combine types including conventional straw walker combines and hybrid combines having transverse threshing cylinders and rotary separators.

Figure 2:
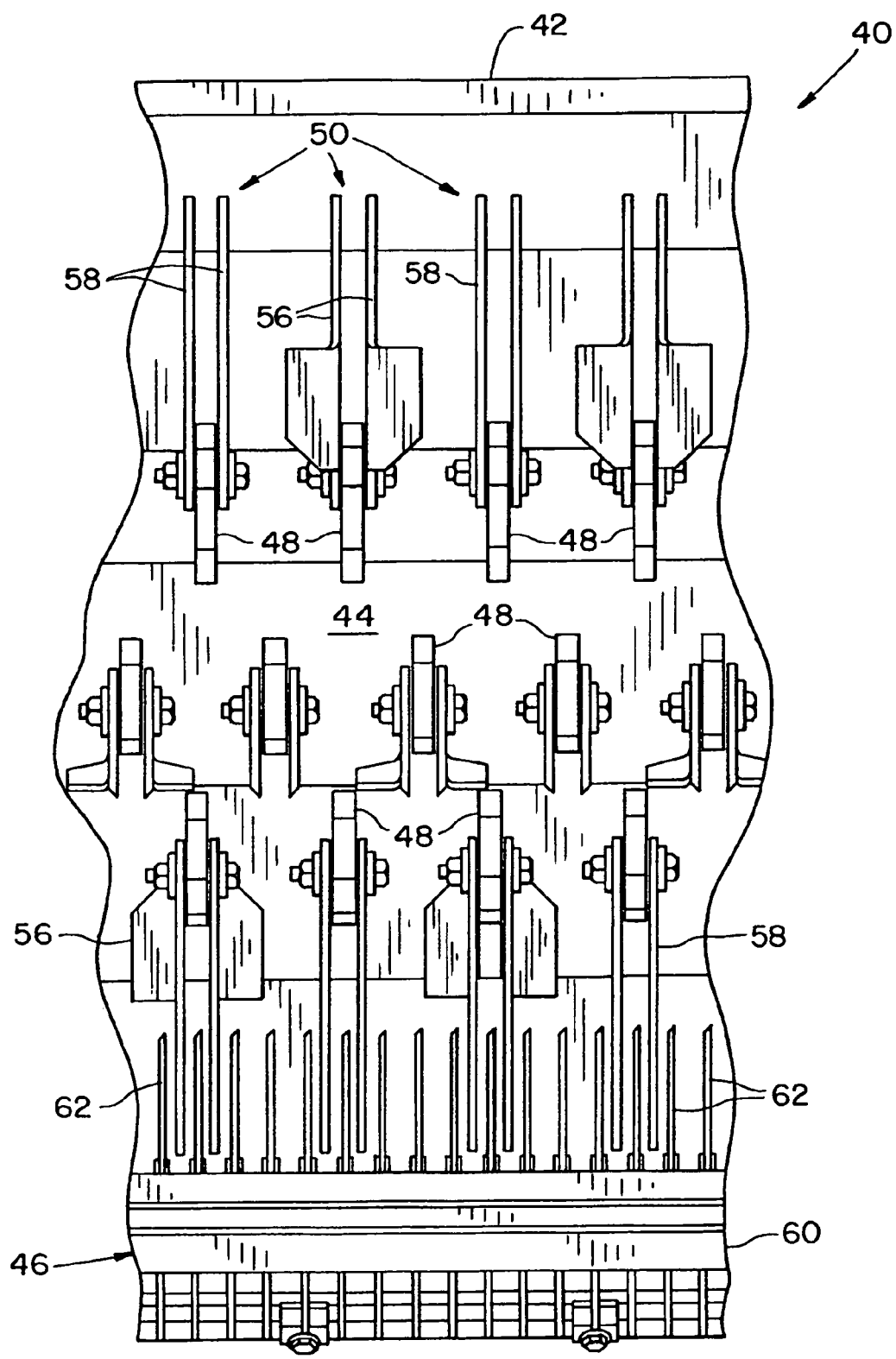
FIG. 2 is a fragmentary, plan view of the straw chopper shown in FIG. 1.
Figure 3:
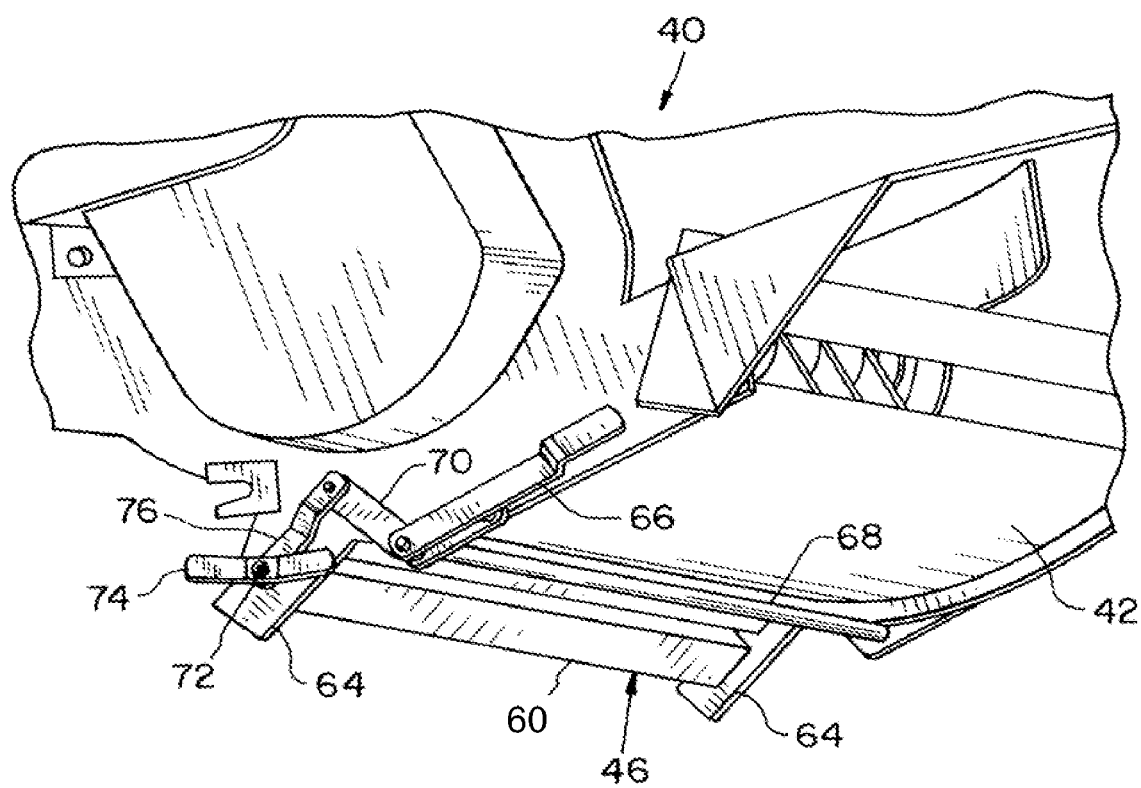
FIG. 3 is a fragmentary, perspective view of the straw chopper shown in FIGS. 1 and 2.

Referring to FIGS. 1 and 2, conjunctively, straw chopper 40 includes a housing 42, rotor 44, and a stationary knife bank 46. Rotor 44 is provided with a plurality of mounting locations 48 for receiving straw chopper blades 50. Housing 42 is provided with an inlet 52 for receiving previously processed harvested crop material other than grain and an outlet 54 for discharging the chopped crop material back to the field. Housing 42 also carries stationary knife bank 46 that cooperates with the rotating straw chopper blades 50. In FIG. 1, rotor 44 would rotate in a counterclockwise direction.

As shown in FIG. 2, rotor 44 is provided with two types of chopper blades 50; namely, paddle blades 56 and straight blades 58. Straight blades 58 are relatively conventional in design and are provided with sharpened leading and trailing edges and a mounting assembly so they can be pendulously mounted on the mounting locations. Straight blades 58 have cutting edges on both the leading and trailing edges so that they can be reversed if the original leading edge becomes too dull. Paddle blades 56 include a transversely extending paddle. All of the above identified straw chopper blade embodiments are illustrated as having a serrated cutting edge and having a single ground side; however, non-serrated cutting edges could also be used as could be double beveled cutting edges.

Referring now to FIGS. 3-7, stationary knife bank 46 is shown in greater detail. Stationary knife bank 46 includes a frame 60 carrying a plurality of stationary knives 62. Frame 60 can be thought of as integrally including or separately attached to a pair of end plates 64 at either end of stationary knife bank 46. End plates 64 extend in a generally downward direction when straw chopper 40 is in an operating orientation as shown in FIGS. 1 and 3-5. Each end plate 64 includes a slot 65 allowing adjustable movement of stationary knife bank 46, as will be described hereinafter.

Figure 4:
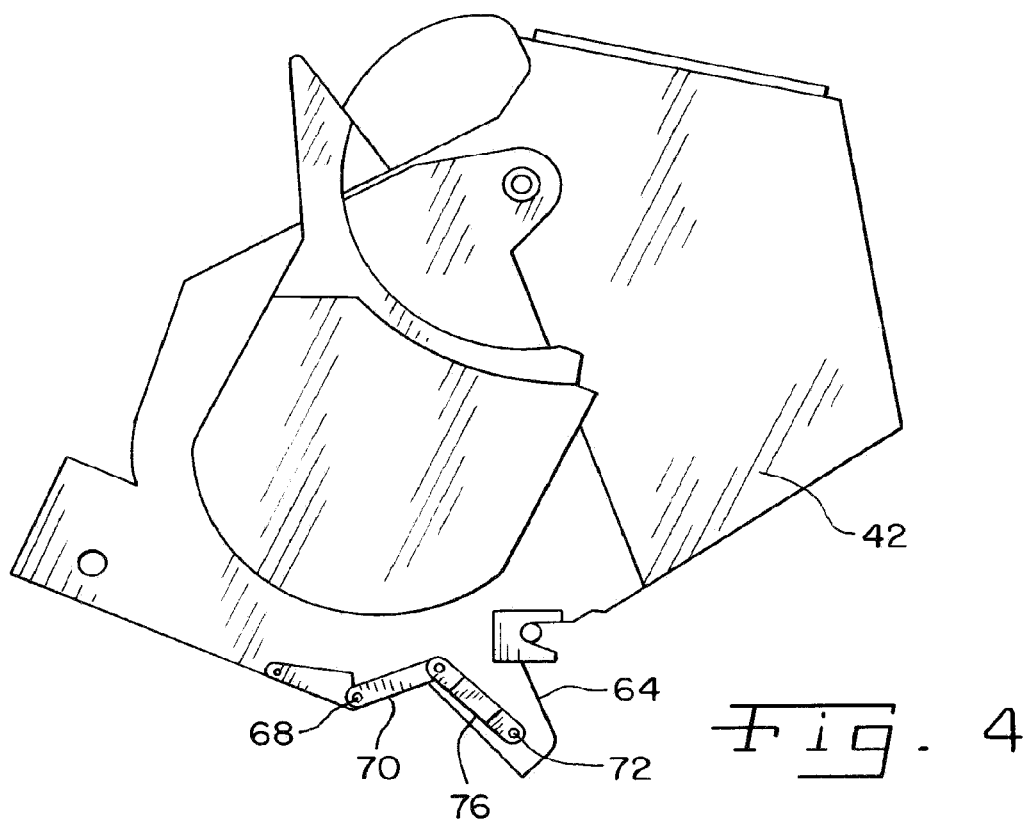
FIGS. 4 and 5 are opposite end views of the straw chopper, with the near side shield being removed in FIG. 5.
Figure 5:
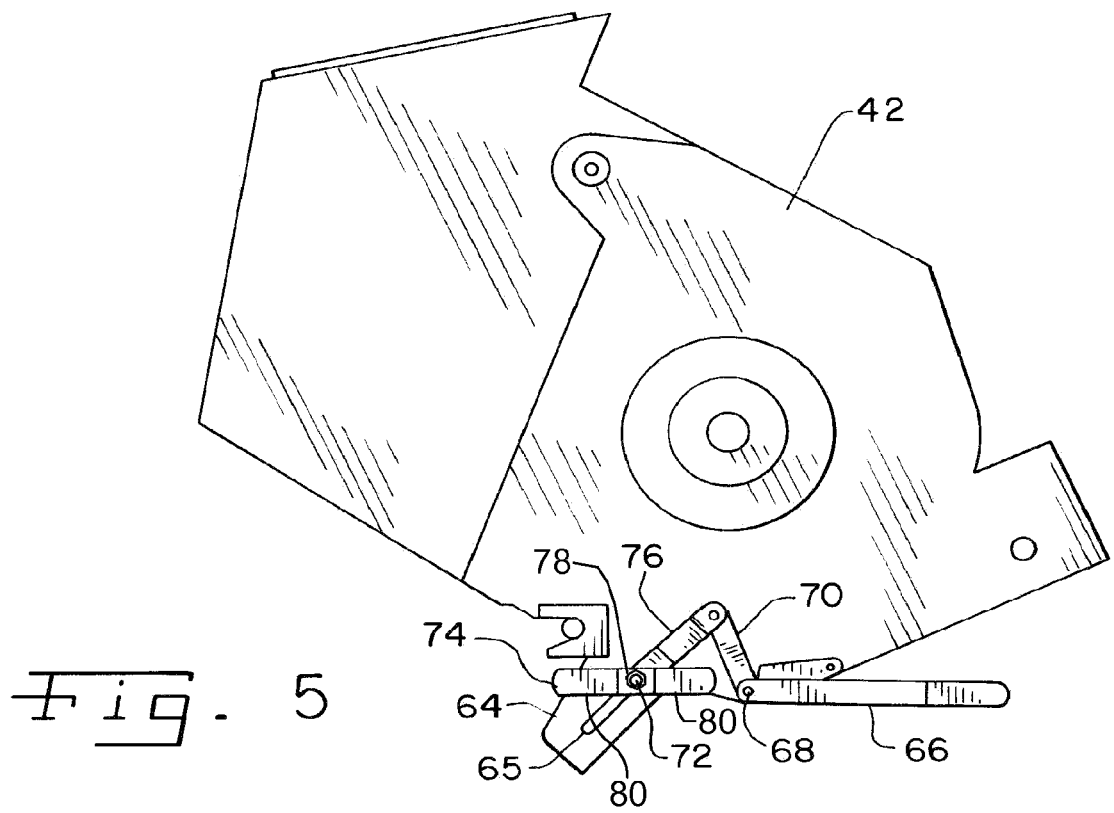
Figure 6:
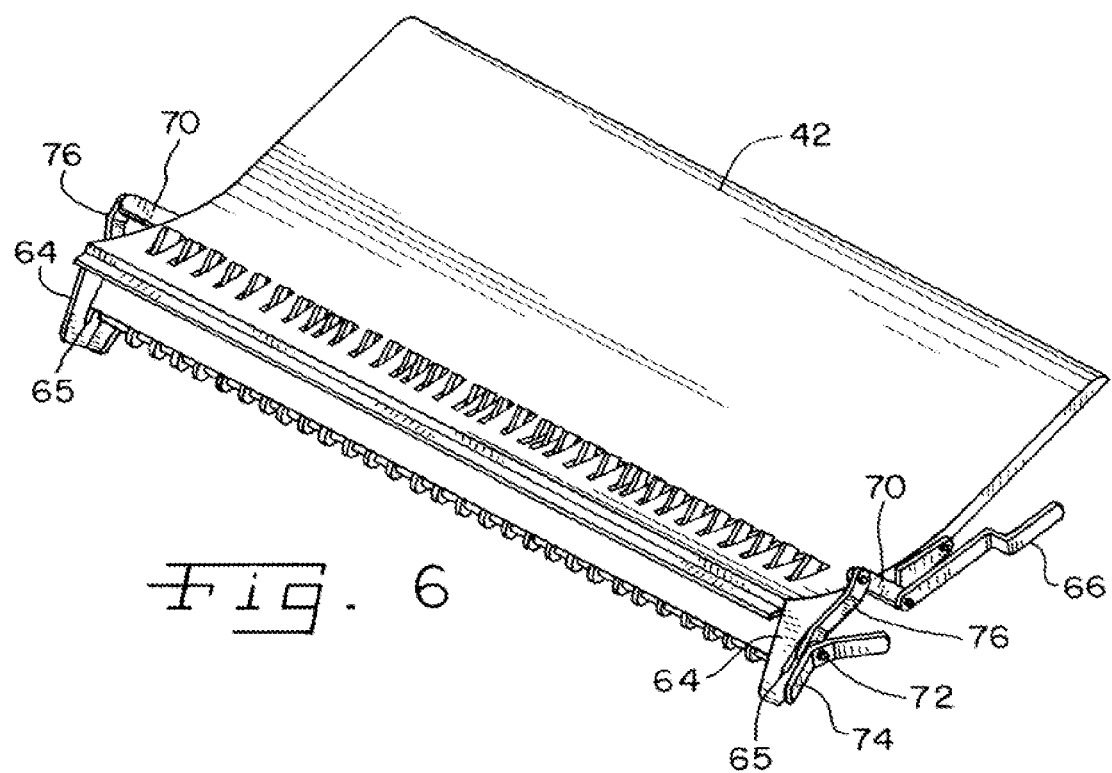
FIG. 6 is a perspective view of the bottom pan and stationary knife bank in the straw chopper of FIGS. 1-5.
Figure 7:
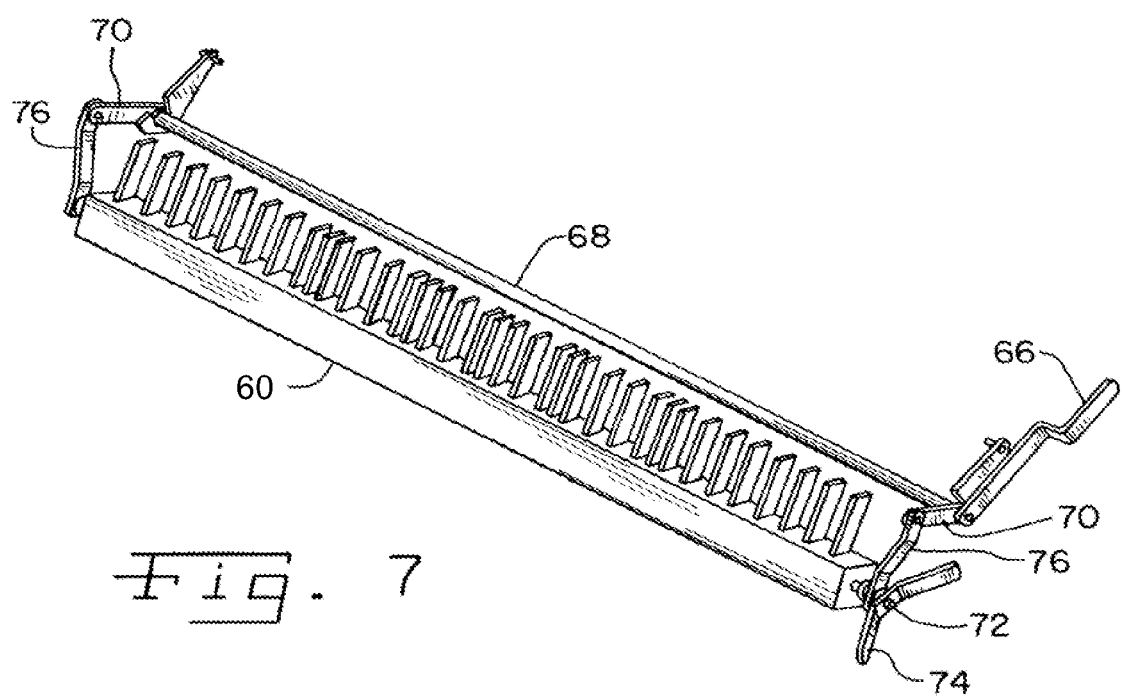
FIG. 7 is a perspective view of the stationary knife bank shown in FIG. 6.

A positioning handle 66 is pivotally mounted to housing 42 using a pivot rod 68. Pivot rod 68 extends through a pair of openings on either side of housing 42 and is rigidly attached to positioning handle 66, such as by welding. Positioning handle 66 has one end forming a positioning grip handle for an operator, and an opposite end rigidly attached to a first linkage linkage 70 of a two-bar linkage, including a second linkage 76 which in turn is coupled with tension rod 72. Another two-bar linkage including an additional first linkage 70 and second linkage 76 interconnects pivot rod 68 and tension rod 72 on the side opposite positioning handle 66, as shown in FIG. 4. This second two-bar linkage assures that frame 60 moves parallel to rotor 44 upon actuation of positioning handle 66.

Positioning handle 66 can also be configured with a generally L-shape, with one leg forming the grip handle for an operator, and the other leg pivotally coupled with second linkage 76.

Tension rod 72 extends through opposite end plates 64, and includes a threaded end which is coupled with wing nut 74. Wing nut 74 includes a female threaded portion 78 and a pair of oppositely extending, angularly oriented handles 80 for grasping by an operator. Wing nut 74 may also include a single handle extending from the female threaded portion 78 if desired.

During use, wing nut 74 is turned by hand counterclockwise to loosen tension rod 72 extending between opposing end plates 64. Positioning handle 66 is grasped by an operator and pivoted about the axis of pivot rod 68. The position of positioning handle 66 determines the extent to which stationary knives 62 extend between rotor blades 50 (including paddle blades 56 and straight blades 58). Tension rod 72 slides within slots 65 of each end plate 64 to a desired position. When stationary knife bank 46 is at a desired position, wing nut 74 is tightened by turning in a clockwise direction. In the embodiment shown, positioning handle 66 is most conveniently grasped with the right hand and held in place while wing nut 74 is turned with the left hand to lock stationary knife bank 46 in place.

In the embodiment of straw chopper 40 shown and described, a single wing nut and handle are attached to either end of tension rod 72. However, it is also possible to use a pair of wing nuts 74 and/or positioning handles 66 at opposite ends of tension rod 72, depending on the application.

Having described the preferred embodiment, it will become apparent that various modifications can be made without departing from the scope of the invention.

The invention claimed is:
1. A straw chopper for an agricultural harvesting machine, comprising:
a housing;
a rotor carried by said housing, said rotor including a plurality of pendulously mounted knife blades;

a stationary knife bank including a plurality of stationary knife blades adjustably movable toward and away from said rotor, said stationary knife bank including a tension rod extending longitudinally through said stationary knife bank and having a threaded end, and a nut threadingly engaged with said threaded end;

a pair of linkages at each end of said stationary knife bank, each said linkage coupled with a corresponding end of said tension rod; and a pivot rod and a positioning handle coupled with an end of said pivot rod, each said linkage coupled with a corresponding end of said pivot rod.

2. The straw chopper of claim 1, including a pair of end plates, each said end plate positioned at a respective end of said stationary knife bank, each said end plate including a slot, said tension rod extending through each said slot.

3. The straw chopper of claim 2, wherein each said end plate extends generally downward from said housing.

4. The straw chopper of claim 1, wherein said nut is a wing nut including a female threaded portion and at least one handle extending from said female threaded portion.

5. The straw chopper of claim 4, wherein said wing nut includes a pair of handles oppositely extending from said threaded nut.

6. A straw chopper for an agricultural harvesting machine, comprising:
   a housing;
   a rotor carried by said housing, said rotor including a plurality of pendulously mounted knife blades;
   a stationary knife bank including a plurality of stationary knife blades adjustably movable toward and away from said rotor, said stationary knife bank including a tension rod extending longitudinally through said stationary knife bank and having a threaded end, and a nut threadingly engaged with said threaded end;
   a pair of linkages at each end of said stationary knife bank, each said linkage coupled with a corresponding end of said tension rod; and
   a pivot rod and a positioning handle coupled with an end of said pivot rod, each said linkage coupled with a corresponding end of said pivot rod, at least one said linkage comprises a two bar linkage.

7. An agricultural harvesting machine, comprising:
   a separator for separating grain crop material from non-grain crop material; and
   a straw chopper in communication with said separator for receiving the non-grain crop material, said straw chopper including:
      a housing;
      a rotor carried by said housing, said rotor including a plurality of pendulously mounted knife blades;
      a stationary knife bank including a plurality of stationary knife blades adjustably movable toward and away from said rotor, said stationary knife bank including a tension rod extending longitudinally through said stationary knife bank and having a threaded end, and a nut threadingly engaged with said threaded end;
      a pair of linkages at each end of said stationary knife bank, each said linkage coupled with a corresponding end of said tension rod; and
      a pivot rod and a positioning handle coupled with an end of said pivot rod, each said linkage coupled with a corresponding end of said pivot rod.

8. The agricultural harvesting machine of claim 7, including a pair of end plates, each said end plate positioned at a respective end of said stationary knife bank, each said end plate including a slot, said tension rod extending through each said slot.

9. The agricultural harvesting machine of claim 8, wherein each said end plate extends generally downward from said housing.

10. The agricultural harvesting machine of claim 7, wherein said nut is a wing nut including a female threaded portion and at least one handle extending from said female threaded portion.

11. The agricultural harvesting machine of claim 10, wherein said wing nut includes a pair of handles oppositely extending from said threaded nut.

12. An agricultural harvesting machine, comprising:
   a separator for separating grain crop material from non-grain crop material; and
   a straw chopper in communication with said separator for receiving the non-grain crop material, said straw chopper including:
      a housing;
      a rotor carried by said housing, said rotor including a plurality of pendulously mounted knife blades;
      a stationary knife bank including a plurality of stationary knife blades adjustably movable toward and away from said rotor, said stationary knife bank including a tension rod extending longitudinally through said stationary knife bank and having a threaded end, and a nut threadingly engaged with said threaded end;
      a pair of linkages at each end of said stationary knife bank, each said linkage coupled with a corresponding end of said tension rod; and
      a pivot rod and a positioning handle coupled with an end of said pivot rod, each said linkage coupled with a corresponding end of said pivot rod, at least one said linkage comprises a two bar linkage.

13. A method of adjusting a stationary knife bank in a straw chopper of an agricultural harvesting machine, comprising the steps of:
   loosening a wing nut coupled with a tension rod extending through the stationary knife bank;
   moving a positioning handle attached to said stationary knife bank, thereby moving the stationary knife bank; and
   tightening said wing nut to lock said stationary knife bank in place, said positioning handle is coupled with a pair of linkages which are in turn coupled with respective ends of said tension rod, said movement of said positioning handle causing movement of said pair of linkages which effects said movement of the stationary knife bank.

14. The method of adjusting a stationary knife bank of claim 13, including a pair of end plates respectively positioned at ends of said tension rod, each said end plate including a slot, said moving step causing translational movement of said tension rod in said slots.

* * * * *